Patented Apr. 3, 1951

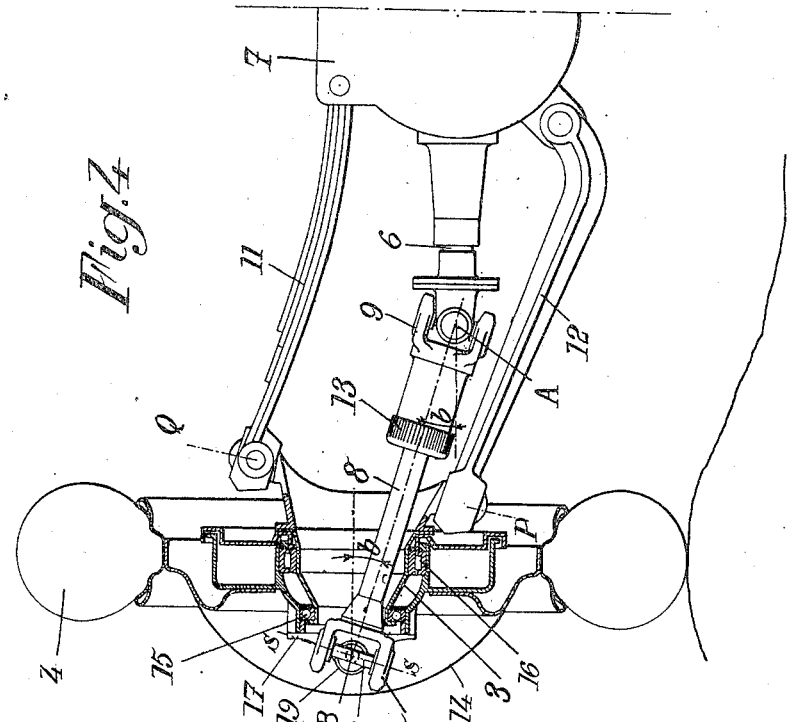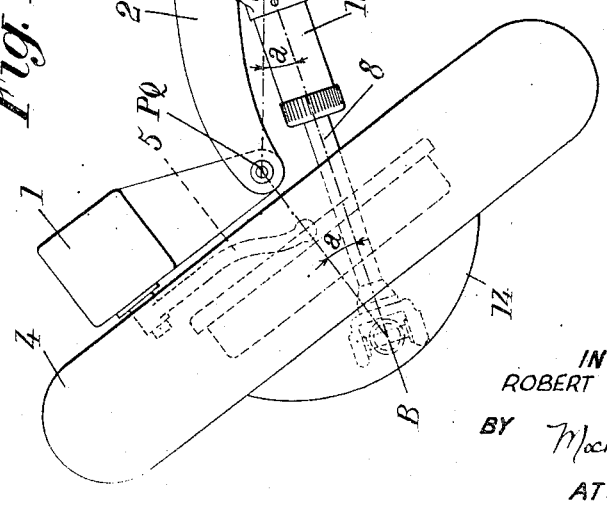

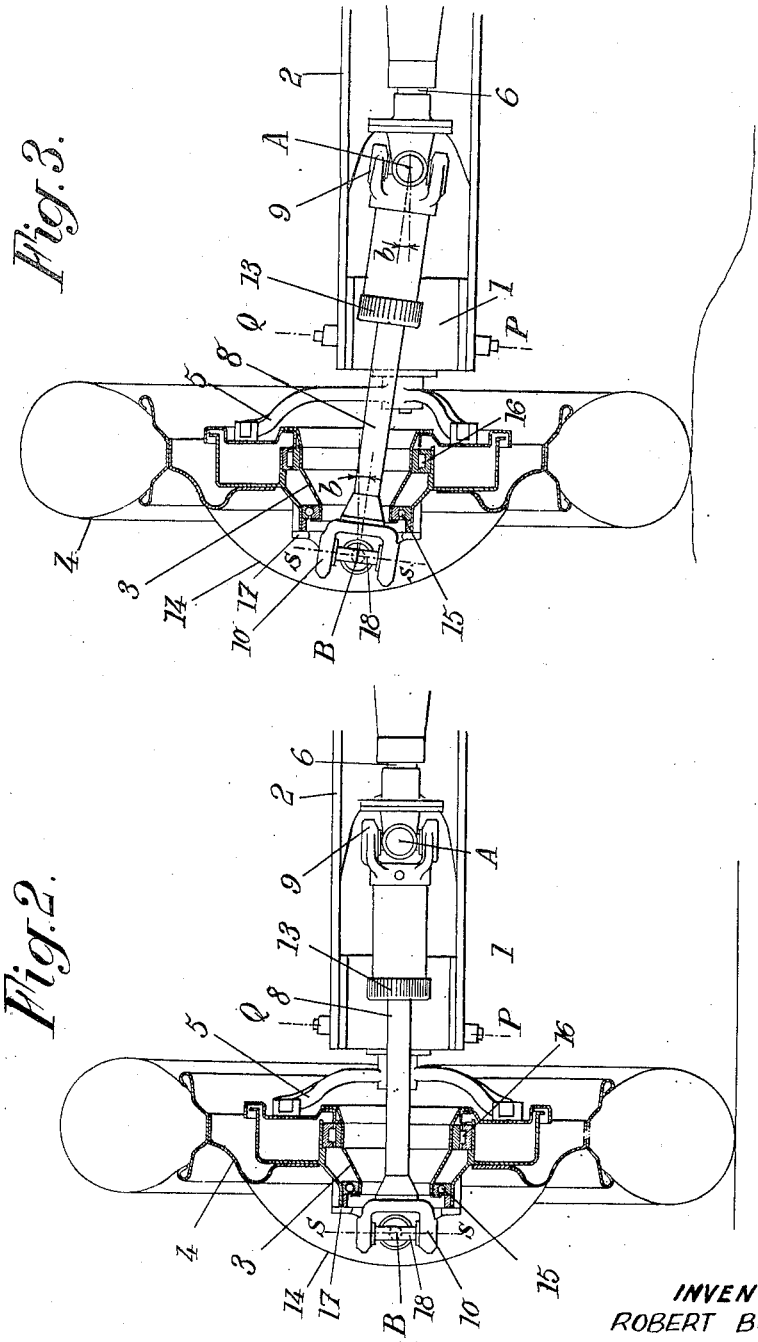

2,547,435

UNITED STATES PATENT OFFICE 2,547,435

DRIVE SHAFT ARRANGEMENT FOR DRIVING STEERING WHEELS

Robert Bouchard, Saint-Germain en Laye, France

Application January 27, 1948, Serial No. 4,631
In France February 6, 1947

1 Claim. (Cl. 180—43)

The present invention relates to drive transmission systems for automobile vehicle driving and steering wheels, these systems being of the kind in which the vehicle driving shaft is connected to the wheel by an intermediate shaft the respective ends of which are coupled respectively with said driving shaft and with said wheel through Cardan points the respective centers of which are disposed symmetrically to each other with reference to a plane passing through the steering pivot axis about which said wheel is angularly movable.

The chief object of my invention is, for given overall dimensions of the whole, to increase as much as possible the distance between the centers of these Cardan joints so as to reduce the maximum angles of operation of these joints.

For this purpose, according to my invention, the wheel end of said intermediate shaft and the Cardan joint mounted on this shaft end are disposed practically wholly on the inner side of the plane defined by the two pivot axes thereof, the only elements of this joint which project beyond this plane on the outer side thereof being the pivot means of said joint provided along said pivot axes.

Preferred embodiments of my invention will be hereinafter described with reference to the accompanying drawings, given merely by way of example and in which:

Fig. 1 is a plan view of an automobile vehicle driving and steering wheel provided with the drive mechanism according to my invention, the wheel being shown turned for steering purposes.

Figs. 2 and 3 show, in elevational view, with parts in section, the wheel of Fig. 1 in two different positions, i. e. Fig. 2 without steering angular displacement and without vertical displacement and Fig. 3 without steering angular displacement but with a vertical displacement.

Fig. 4 shows in elevational view a wheel of the same kind, with a different suspension.

I have shown on Figs. 1 to 3, by way of example, suspension including a casing 1 which contains the spring means (of any type whatever) and is pivotally connected with a part 2 of the vehicle chassis about an axis PQ, which is the steering axis (shown vertical merely in order to simplify the drawing). The stub axle 3 of the wheel 4, which is hollow in order to afford passage for the intermediate shaft which is going to be referred to, is for instance carried by an arm 5, advantageously a double arm in the present instance, to permit passage of said shaft.

Such a wheel is driven from the shaft 6 which projects from the differential (shown at 7 on Fig. 4) through an intermediate shaft 8 connected to shaft 6 through a Cardan joint 9 having its center at A and to the wheel, through another Cardan joint the center of which is at B. The outer joint, i. e. the one having its center at B, includes a fork 10 carried by the wheel end of intermediate shaft 8, a part 17 rigid with wheel 4, and a cross 18 forming two pivot pins respectively journalled in fork 10 and part 17, the axes of these pivots being at right angles to each other. The plane defined by these two pivot axes is shown at S—S on Figs. 2, 3 and 4.

Centers A and B are disposed substantially in symmetrical positions with respect to a plane passing through the axis PQ, whereby angles $a$, $a$ (Fig. 1) are constantly equal to each other.

According to my invention, the Cardan joint having its center at B is disposed practically wholly on the inner side of plane S—S defined by the pivot axes of the cross 18 of this joint. The word "practically" is used because one half of the pivot pins of cross 18 and one half of the bearings carried by parts 10 and 17 is necessarily located on the outer side of plane S—S. But the whole of the remainder of this joint is located on the inner side of plane S—S.

Thus, for given overall dimensions of the system, it is possible to give distance A B the maximum value and therefore to reduce to a value as low as possible the angle $b$ (Fig. 4) imposed on the Cardan joints for maximum vertical displacements of wheel 4.

I have illustrated, on Fig. 4, the application of my invention to an independent wheel suspension including an elastic parallelogram 11, 12. In this case, stub axle 3 is pivotally mounted on the ends of said parallelogram, along axis PQ. For the remainder, the drive of this stub axle is as above.

It is of course necessary, in every case, to provide means for permitting increase or reduction of the length of shaft 8, which result is obtained through a sliding device 13 of any known type.

Finally, it should be noted that hollow stub axle 3 can be obtained through any known means, but more especially by stamping. It will be made of such a shape that it permits free relative displacement of intermediate shaft 8 for the most important steering and vertical displacements.

On the outside, the wheel includes a hub protector 14 intended to cover the outer Cardan joint, which can thus be made accessible, same as bearings 15 and 16, preferably of the needle type.

It is thus possible easily to lubricate this outer Cardan joint, the elements of which are advantageously fitted in such manner as to be in the position most favorable for said lubrication.

What I claim is:

In a vehicle, a frame, a wheel, a hollow stub axle for said wheel pivoted to said frame about a steering pivot axis, suspension means interposed between said stub axle and said frame, a driving shaft carried by said frame, and a flexible drive between said shaft and said wheel including a telescopic intermediate shaft extending through said stub axle, a Cardan joint mounted to connect the inner end of said intermediate shaft with said driving shaft, and a similar Cardan joint mounted to connect the outer end of said intermediate shaft with said wheel, the center of said second mentioned Cardan joint being located on the outer side of said wheel and in symmetrical relation to the center of the first mentioned Cardan joint with respect to a plane passing through said steering pivot axis, the wheel end of said intermediate shaft and the second mentioned Cardan joint being disposed practically wholly on the inner side of the plane defined by the two pivot axes thereof, the only elements of this second mentioned joint which project beyond this plane to the outer side thereof being the pivot means of said second mentioned joint provided along said pivot axes thereof.

ROBERT BOUCHARD.

REFERENCES CITED

The following references are of record in the file of this patent:

UNITED STATES PATENTS

| Number | Name | Date |
|---|---|---|
| 1,515,815 | Roche | Nov. 18, 1924 |
| 1,960,457 | Roche | May 29, 1934 |
| 2,084,429 | Bussien | June 22, 1937 |